US008488176B2

(12) United States Patent
Dietrich et al.

(10) Patent No.: US 8,488,176 B2
(45) Date of Patent: *Jul. 16, 2013

(54) METHOD FOR ANALYZING USAGE OF PRINTERS

(75) Inventors: Brenda Dietrich, Yorktown Heights, NY (US); Michael Karasick, Beijing (CN); Bonnie Ray, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,131

(22) Filed: Jun. 11, 2012

(65) Prior Publication Data

US 2012/0250089 A1 Oct. 4, 2012

Related U.S. Application Data

(63) Continuation of application No. 12/327,185, filed on Dec. 3, 2008.

(30) Foreign Application Priority Data

Dec. 7, 2007 (CN) .......................... 2007 1 0186540

(51) Int. Cl.
*G06F 3/12* (2006.01)
(52) U.S. Cl.
USPC .......................................... 358/1.15; 706/46
(58) Field of Classification Search
None
See application file for complete search history.

(56) References Cited

U.S. PATENT DOCUMENTS

| 5,580,177 A | 12/1996 | Gase et al. |
| 5,819,015 A | 10/1998 | Martin et al. |
| 2006/0206445 A1* | 9/2006 | Andreoli et al. ................ 706/52 |
| 2008/0273224 A1 | 11/2008 | Maulsby et al. |

FOREIGN PATENT DOCUMENTS

JP 2007115175 A 5/2007

OTHER PUBLICATIONS

Wei-Jen Li et al., Email Archive Analysis Through Graphical Visualization, Proceedings of the 2004 ACM Workshop on Visualization and Data Mining for Computer Security, Washington, D.C., USA, Oct. 29, 2004, pp. 128-132.
Kent Yip, USPTO Office Action, U.S. Appl. No. 12/327,185, Notification Date Jun. 21, 2012, 16 pages.
Yip, Office Action Communication for U.S. Appl. No. 12/327,185 Dated Oct. 16, 2012, 9 pages.
Yip, Notice of Allowance and Fee(s) Due for U.S. Appl. No. 12/327,185 dated Feb. 20, 2013, 10pgs.

* cited by examiner

*Primary Examiner* — Marivelisse Santiago Cordero
*Assistant Examiner* — Kent Yip
(74) *Attorney, Agent, or Firm* — Jeff Tang; Hoffman Warnick LLC

(57) ABSTRACT

The present invention provides a method for analyzing usage of printers. A method in accordance with an embodiment includes: obtaining from at least one printer information about a plurality of print tasks performed by each printer, wherein the information about print tasks at least contains information of print requesters, print document attributes, and print time of each of the print tasks; and transforming the information about print tasks into an organizational representation based on information of organizational structure containing the print requesters. In the present invention, entities having a costly pattern are identified by mining historical usage data of the printers, thus driving the redesign of business process associated with the entities, performing print policies optimization on each entity associated with the printers based on the mined historical usage data, thereby reducing unnecessary paper consumption.

10 Claims, 6 Drawing Sheets

METHOD FOR ANALYZING USAGE OF PRINTERS

CROSS-REFERENCE TO RELATED APPLICATIONS

This patent application is a continuation of co-pending patent application Ser. No. 12/327,185, filed on Dec. 3, 2008, which is incorporated herein by reference in its entirety.

TECHNICAL FIELD

The present invention relates to the data processing field, in particular to a method for analyzing usage of printers.

RELATED ART

The average American office worker is estimated to use a sheet of paper every 12 minutes—a ream per person every two and a half working weeks—and to dispose of 100-200 pounds of paper every year. The financial costs of paper extend far beyond just purchasing the paper. There are also costs associated with:

Printer and copier maintenance and breakdown restoration;

Storage—to store 2 million paper documents, an organization can expect to spend between $40,000 and $60,000 on filling cabinets alone. However, if those same documents are stored by using CD-ROMs, they could fit on fewer than ten CD-ROMs;

Lost documents postage;

Document obsolescence; and

Labor inefficiency.

Additionally, paper production is a significant contributor to air pollutants. Pulp and paper mills in the U.S. produce approximately 245,000 metric tons of toxic air pollutants every year, which may include volatile organic compounds, sulfur, absorbable organic halides, chloroform, dioxin, and furan. All of these toxins have known health risks. Worldwide, pulp and paper is the fifth largest industrial consumer of energy, accounting for four percent of the world's energy use, and the processes use more water to produce a ton of product than any other industry. Overall, producing one ton of paper uses 98 tons of various resources. To obtain the more information, see, for example, forestethics.org/pdf/redece.pdf.

There has been much prior work on the monitoring of printers to detect malfunction, i.e., low toner, paper outage, etc., to manage printer resources. See e.g., U.S. Pat. No. 5,580,177, "Printer/client network with centrally updated printer drivers and printer status monitoring", S T Gase, C R White, 1996, and U.S. Pat. No. 5,819,015, "Method and apparatus for providing remote printer resource management", J K Wedinger, J F Webb, G M Songer, C M Songer, M G Rivers, . . . , 1998.

Additionally, there has also been some prior work on mining e-mail messages to discover relationships between groups of users. See e.g., Li, W., Hershkop, S., and Stolfo, S. J. 2004, "Email archive analysis through graphical visualization", Proceedings of the 2004 ACM Workshop on Visualization and Data Mining For Computer Security (Washington D.C., USA, Oct. 29-29, 2004). VizSEC/DMSEC'04. ACM Press, New York, N.Y., 128-132.

However, the prior works do not consider monitoring of usage of printers at print request ID level, to drive business print policies or business process redesign, so as to reduce unnecessary paper consumption for saving energy.

SUMMARY OF THE INVENTION

The present invention provides a method for analyzing usage of printers, to identify entities having a costly print pattern by mining historical usage data of the printers. The resultant information can be used to drive the redesign of the business processes associated with the entities and perform print policies optimization on each entity associated with the printers based on the mined historical usage data, thereby reducing unnecessary paper consumption.

According to one aspect of the present invention, there is provided a method for analyzing usage of printers, comprising: obtaining from at least one printer information about a plurality of print tasks performed by each printer, wherein the information about print tasks at least contains information of a print requestor, print document attributes, and print time of each of the print tasks; and transforming the information about print tasks into an organizational representation based on information of an organizational structure containing the print requesters.

According to another aspect of the present invention, there is provided a method for analyzing usage of printers, comprising: obtaining from at least one printer information about a plurality of print tasks performed by each printer, wherein the information about print tasks at least contains information of a print requestor, print document attributes, and print time of each of the print tasks; identifying a plurality of historical print task equivalence classes from the information about print tasks, wherein each of the historical print task equivalence classes comprises a plurality of historical print tasks involving the same or similar documents; based on the information of print requestor and print time, obtaining a user sequence for each of the historical print task equivalence classes; and based on information of an organizational structure containing the requesters, identifying user sequences each spanning a plurality of organizational units from a plurality of the user sequences respectively as an informal workflow.

According to still another aspect of the present invention, there is provided an apparatus for analyzing usage of printers, comprising: a print information mining unit configured to obtain from at least one printer information about a plurality of print tasks performed by each printer, wherein the information about print tasks at least contains information of a print requestor, print document attributes, and print time of each of the print tasks; and an organizational representation generating unit configured to transform the information about print tasks into an organizational representation based on information of organizational structure containing the print requesters.

According to a further aspect of the present invention, there is provided an apparatus for analyzing usage of printers, comprising: a print information mining unit configured to obtain from at least one printer information about a plurality of print tasks performed by each printer, wherein the information about print tasks at least contains information of print requestor, print document attributes, and print time of each of the print tasks; an equivalence class identifying unit configured to identify a plurality of historical print task equivalence classes from the information about print tasks, wherein each of the historical print task equivalence classes comprises a plurality of historical print tasks involving same or similar documents; an user sequence mapping unit configured to, based on the information of print requestor and print time, obtain a user sequence for each of the historical print task equivalence classes; and an informal workflow identifying unit configured to, based on information of organizational structure containing the requesters, identify user sequences each spanning a plurality of organizational units from a plurality of the user sequences respectively as an informal workflow.

BRIEF DESCRIPTION OF THE DRAWINGS

The features, advantages and purposes of the present invention will be better understood from the following description of the detailed implementation of the present invention read in conjunction with the accompanying drawings.

DETAILED DESCRIPTION OF THE INVENTION

Next, a detailed description of embodiments of the present invention will be given with reference to the drawings.

First, the method for analyzing usage of printers of the present invention will be described.

Figure 1:
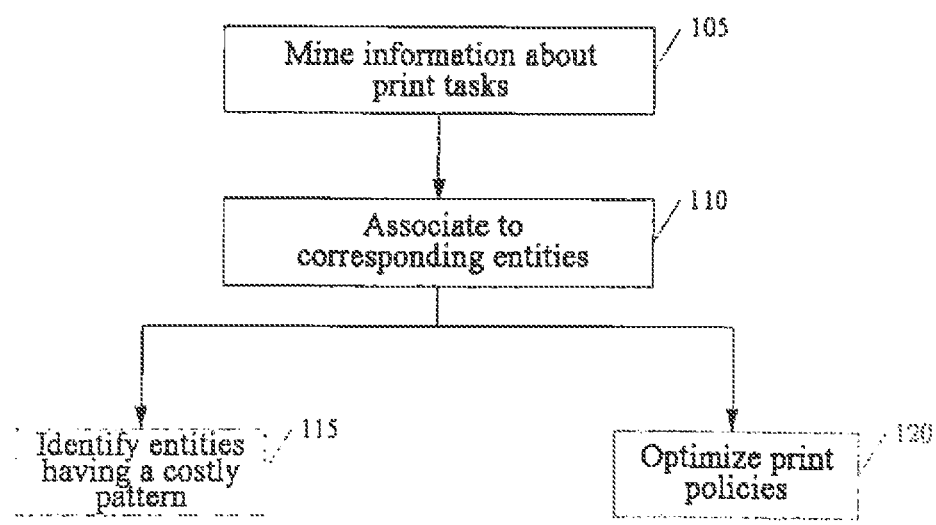
FIG. 1 is a flowchart of a method for analyzing usage of printers according to an embodiment of the present invention.

FIG. 1 is a flowchart of a method for analyzing usage of printers according to an embodiment of the present invention. As shown in FIG. 1, first at step 105, from one or more printers, information about a plurality of print tasks performed by the printers is mined. In an Intranet of an enterprise, for example, since printers are shared by users over the enterprise, in order to distinguish the users who send print requests to the shared printers and perform print tasks, the information about print tasks mined from the shared printers should contain, for each of the print tasks, at least such information as the requestor ID, as well as request size, time stamp and attributes of printed document used for subsequent analysis of entities having a costly pattern and optimization of print policies. Therein the requestor ID may be identification or IP address of user device. In addition, the above attributes of printed document may include file type, document name, business process watermark, etc. Additionally, in addition to the above attributes, the mined information about print tasks may further include printer ID, print characteristics, etc.

The printer ID is used to distinguish different printers in intranet of an enterprise, while the print characteristics may contain color vs B/W, resolution, paper size, 1-sided vs 2-sided, etc. However, it is not limited to this, in addition to the above information, the mined information about print tasks may certainly further contain more other information. It can be appreciated by the person skilled in the art that mining information about print tasks of the printers can be implemented by using existing technical means and known knowledge in the art, there is no special limitation on this step in the present invention.

Next at step 110, based on the above mined information about print tasks, each of the historical print tasks is associated with a corresponding entity performing the print task. Specifically, at this step, each of the historical print tasks is associated with a corresponding user performing the print task by using the requestor IDs in the information about print tasks. Further, each of the users performing the historical print tasks is associated with the organizational units he/she belongs to based on the organizational structure information containing these users, which may be obtained, for example, from the records of the human resource management department of the enterprise. In addition, business processes can be associated with respective corresponding organizational units by using business process watermarks information (if available) in document attributes, and so on.

Next, at step 115, based on the above mined information about print tasks, entities having a costly pattern are identified by using a mathematical algorithm. Specifically, the entities may be users, organizational units or informal workflows having a costly pattern, which will be detailed below.

The above mentioned mathematical algorithm used at this step may comprise, but is not limited to, cluster analysis, time series analysis or network analysis, etc.

The identification result of this step may be used to drive redesign of business processes associated with the identified entities having a costly pattern so as to reduce business steps involving paper consumption as far as possible.

At parallel step 120, print policy optimization is performed on various entities associated with the above printers based on the information about print tasks.

The above is a description of a method for analyzing usage of printers of the present embodiment. It should be noted that the above steps 115 and 120 are not interrelated, thus they may be performed in an arbitrary order.

Next, as a specific example, a method for analyzing usage of printers to identify users having a costly pattern according to the process of FIG. 1 will be detailed.

Figure 2:
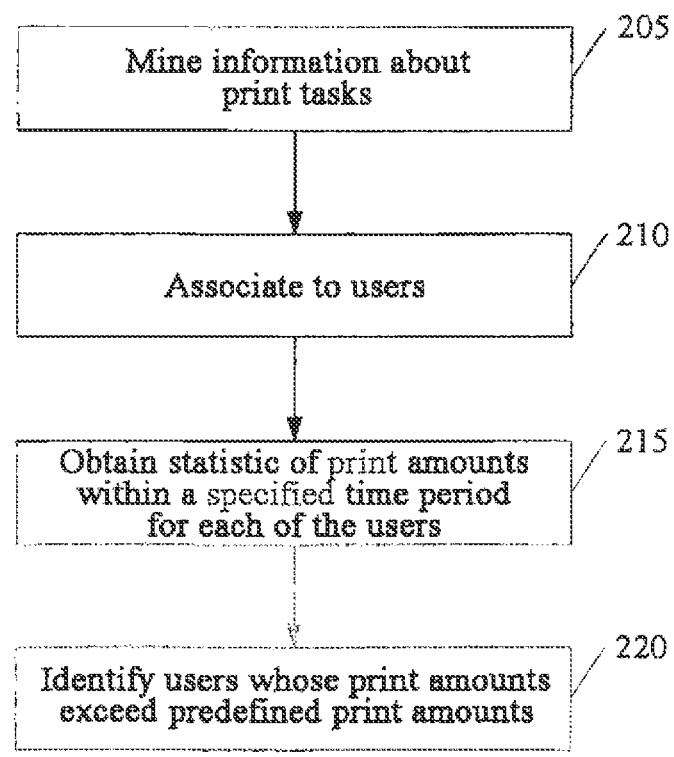
FIG. 2 is a flowchart of a process of analyzing usage of printers to identify users having a costly pattern according to an embodiment of the present invention.

FIG. 2 is a flowchart of a method for analyzing usage of printers to identify users having a costly pattern according to an embodiment of the present invention. As shown in FIG. 2, first, at step 205, from one or more printers, information about a plurality of print tasks performed by the printers is mined. The information about print tasks mined from the printers may contain, for each of the print tasks, at least such information as the requestor ID as well as request size, time stamp, and document attributes used for subsequent analysis of users having a costly pattern.

Next, at step 210, based on the above mined information about print tasks, each of the historical print tasks is associated with a corresponding user performing the print task. Specifically, at this step, by using the requestor IDs in the information about print tasks, each of the historical print tasks represented by the information about print tasks is associated with a corresponding user.

Next, at step 215, based on the above mined information about print tasks, statistics of print amounts over a specified time period are obtained for each of the above corresponding users by using, for example, cluster analysis, time series analysis or network analysis.

At this step, the above specified time period may be one month, for example. In addition, obtaining statistics of print amounts over the specified time period, e.g., one month for each of the corresponding users may contain one or more of the following steps: obtaining statistics of the number of documents printed over the one month for the user, obtaining statistics of the total size of documents printed over the one month for the user, and obtaining statistics of the number of times a same document is printed over the one month for the user.

Further, at this step, for each of the users, statistics of the print amounts over the specified time period are obtained based on such information as request size, time stamp and document attributes associated with the user, which is contained in the information about print tasks. Specifically, for each of the users, all print tasks over one month are identified based on the time stamp information associated with the user in the information about print tasks, and thus statistics of the number of documents printed by the user over the one month corresponding to the print tasks are obtained; based on the time stamp information and the document size information among the document attributes, statistics of the total size of documents printed over the one month are obtained for the user; and based on the time stamp information and the document name information among the document attributes, statistics of the number of times a same document is printed over the one month are obtained for the user.

Next, at step 220, statistics of the print amounts over the specified time period obtained for each of the users are compared to print amounts predefined for the user, to identify those users whose print amounts over the specified time period exceed their predefined print amounts.

Specifically, since statistics of the print amounts over the specified time period obtained for each of the users may be one or more of the number of printed documents, the total size of the printed documents and the number of times a same document is printed by the user over the one month, the print amounts predefined for the user should also contain corresponding metrics. That is, they may contain the following metrics: the number of documents the user is allowed to print over the one month (such as 100 documents), the total size of documents the user is allowed to print over the one month (such as 10M bytes), and the number of times the user is allowed to print a same document over the one month (such as two times), etc.

Thus, at this step, for each of the users, statistics of the print amounts over the specified time period are compared to his/her predefined print amounts, to identify those users whose print amounts over the specified time period exceed their predefined print amounts, and consider those users as ones having a costly pattern.

The above is a detailed description of the method for analyzing usage of printers to identify users having a costly pattern according to an embodiment. In this embodiment, by mining historical usage data of printers and associating them with users performing print tasks, users having a costly pattern can be identified.

Next, as another specific example, a method for analyzing usage of printers to identify organizational units having a costly pattern according to the process of FIG. 1 will be described.

Figure 3:
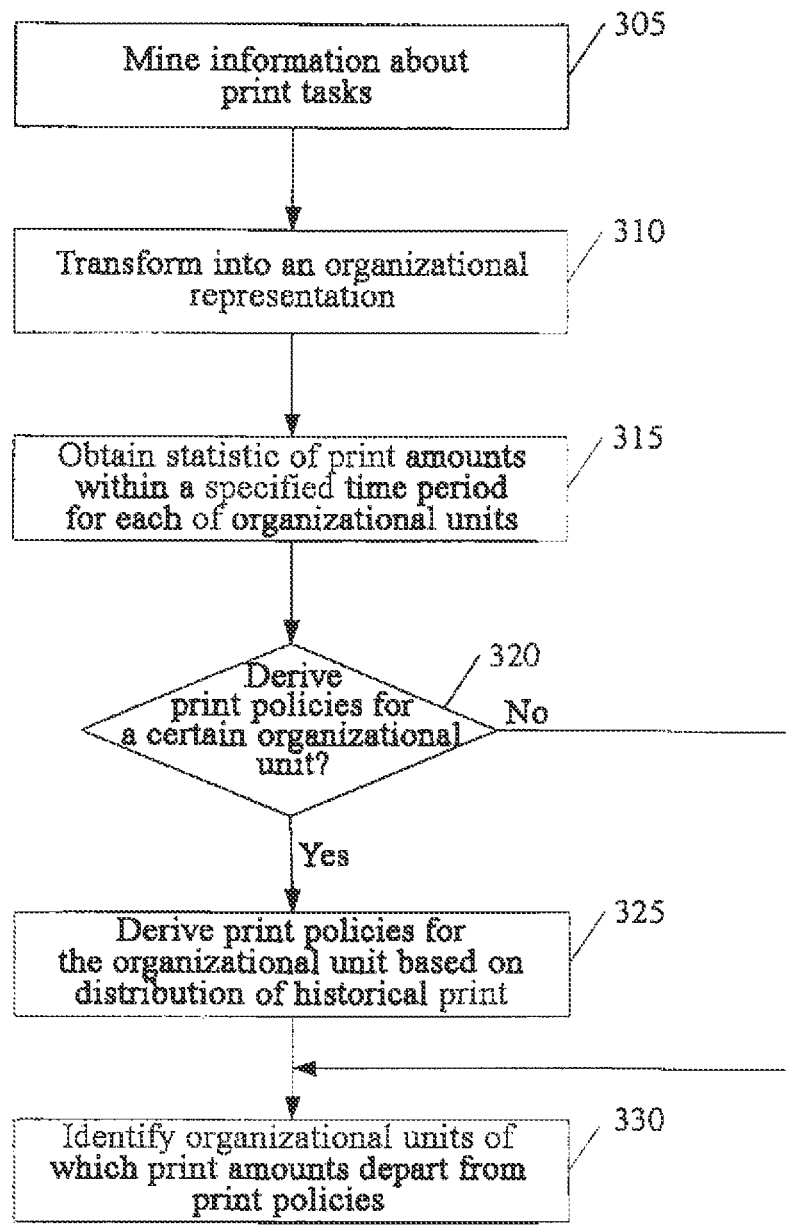
FIG. 3 is a flowchart of a process of analyzing usage of printers to identify organizational units having a costly pattern according to an embodiment of the present invention.

FIG. 3 is a flowchart of a method for analyzing usage of printers to identify organizational units having a costly pattern according to an embodiment of the present invention. As shown in FIG. 3, first, at step 305, from one or more printers, information about a plurality of print tasks performed by the printers is mined. The information about print tasks mined from the printers may contain, for example, for each of the print tasks, at least such information as the requestor ID as well as request size, time stamp and document attributes used for subsequent analysis of organizational units having a costly pattern.

Next, at step 310, based on the above mined information about print tasks, each of the historical print tasks is associated with a corresponding organizational unit, so as to transform the information about print tasks into an organization representation.

Specifically, at this step, by using the requestor IDs in the information about print tasks, each of the historical print tasks represented by the information about print tasks is associated with a corresponding user. Then based on the organizational structure information containing these users, which may be obtained, for example, from the records of the human resource management department of the enterprise, each of the users performing the historical print tasks is associated with the organizational unit he/she belongs to. In this embodiment, the obtained organizational structure may be represented as a tree structure, and each of the users performing the historical print tasks is associated with his/her corresponding organizational unit node in the tree structure, thus forming an organizational representation.

Next, at step 315, based on the above mined information about print tasks, statistics of print amounts over a specified time period are obtained for each of the organizational unit nodes in the above organizational representation by using, for example, cluster analysis, time series analysis or network analysis.

Specifically, at this step, the above specified time period may be one month, for example. In addition, obtaining statistics of print amounts over the specified time period, e.g., one month for each of the organizational unit nodes in the above organizational representation may contain one or more of the following steps: obtaining statistics of the number of documents printed over the one month for each of the organizational unit nodes, obtaining statistics of the total size of documents printed over the one month for each of the organizational unit nodes and obtaining statistics of the number of times a same document is printed over the one month for each of the organizational unit nodes.

Further, at this step, for each of the organizational unit nodes, statistics of the print amounts over the specified time period are obtained based on such information as request size, time stamp and document attributes contained in the information about print tasks. Specifically, for each of the organizational unit nodes, all print tasks of all users over one month are identified based on the time stamp information associated with the organizational unit node in the information about print tasks, and thus statistics of the number of documents printed by the users over the one month corresponding to the print tasks are obtained. Further, based on the time stamp information and the document size information among the document attributes in the information about print tasks, statistics of the total size of documents printed by the users over the one month are obtained for the organizational unit node. In addition, based on the time stamp information and the document name information among the document attributes, statistics of the number of times a same document is printed by the users over the one month are obtained for the organizational unit node.

Next, at step 320, it is determined whether it is needed to derive print policies for one or more certain organizational units in the above mentioned organizational representation. If it is needed, the process proceeds to step 325, otherwise returns to step 330.

At step 325, with respect to each of the organizational units for which deriving print policies is needed, the print policies are derived for it based on the distribution of historical print frequencies and/or print request sizes of the organizational unit. Specifically, the derivation process is as follows: first, for each of the organizational units, the empirical distribution function of print requests is computed with respect to each of the metrics such as the number of documents printed over a specified time period, the total size of documents printed over the specified time period, and the number of times a same document is printed over the specified time period, so as to obtain historical data based typical distributions of print frequencies and/or print request sizes for the organizational unit; then, corresponding policies in relation to the typical distributions are set, which prescribe that, for example, the print amount of documents of its suborganization units over a specified time period can not exceed the 95 percentile of the print amount of documents of the organizational unit over the specified time period.

At step 330, for each of the organizational units in the above organizational representation, the print amounts over the specified time period are compared to the print policies predefined or derived for the organizational unit, to identify those organizational units of which print amounts over the specified time period depart from their print policies. Specifically, since statistics of the print amounts over the specified time period obtained for each of the organizational units may be one or more of the number of printed documents, the total size of the printed documents and the number of times a same document is printed over the one month, the print policies predefined or derived for each of the organizational units may directly be metrics corresponding to the above statistic. That is, the print policies predefined or derived for each of the organizational units may comprise the following metrics: allowing the organizational unit to print a predefined number of documents over the one month (such as 500 documents), allowing the organizational unit to print a predefined total size of documents over the one month (such as 50M bytes), and allowing the organizational unit to print a same document for predefined times over the one month (such as 10 times), etc.

Of course, the print policies predefined or derived for each of the organizational units may also in indirect metrics forms.

Thus, at this step, for each of the organizational units, the print amounts over the specified time period are matched to the print policies predefined or derived for the organizational unit, to identify those organizational units of which print amounts over the specified time period depart from their print policies, and consider those organizational units as ones having a costly pattern.

The above is a detailed description of the method for analyzing usage of printers to identify organizational units having a costly pattern according to an embodiment. In this embodiment, by mining historical usage data of printers and associating them with organizational units performing print tasks, organizational units having a costly pattern can be identified.

Next, as a further specific example, a method for analyzing usage of printers to identify informal workflows according to the process in FIG. 1 will be described.

Figure 4:
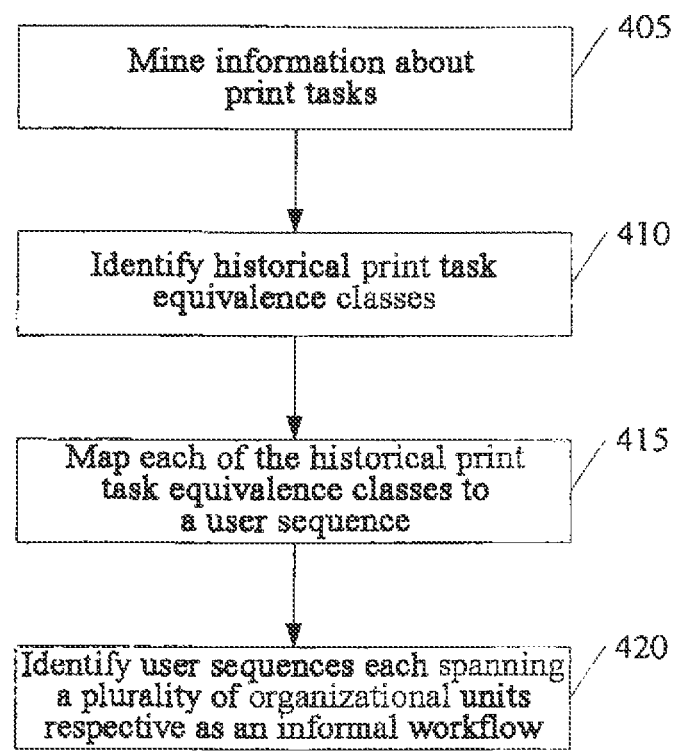
FIG. 4 is a flowchart of a process of analyzing usage of printers to identify informal workflows according to an embodiment of the present invention.

FIG. 4 is a flowchart of a method for analyzing usage of printers to identify informal workflows according to an embodiment of the present invention. As shown in FIG. 4, first, at step 405, from one or more printers, information about a plurality of print tasks performed by the printers is mined. The information about print tasks mined from the printers may contain, for each of the print tasks, at least such information as the requestor ID as well as time stamp and document attributes used for subsequent analysis of informal workflows.

Next, at step 410, based on the document attributes information in the information about print tasks, a plurality of historical print task equivalence classes are identified from the information about print tasks. Therein, each historical print task equivalence class comprises a plurality of historical print tasks involving same or similar documents.

Specifically, at this step, first, based on the document name information contained in the information about print tasks, by using a cluster analysis method such as a fuzzy name matching algorithm, cluster analysis is performed on the document names to look for all equivalence classes of same or similar documents. Each equivalence class determined by using the fuzzy name matching algorithm means all documents of which names are identical or similar among the documents involved in the information about print tasks.

Then, based on the information about print tasks, for each of the equivalence classes of same or similar documents, a plurality of historical print tasks associated thereto are found, thus forming a historical print task equivalence class corresponding to the equivalence class.

An illustrative fuzzy name matching algorithm is described in, for example, Paul Wu Horng-Jyh, Na Jin-Cheon and Christopher Khoo Soo-Guan, (Nanyang Technological University, 31 Nanyang Link, Singapore 637718), "A hybrid approach to fuzzy name search incorporating language-based and text-based principles" (Journal of Information Science, Vol. 33, No. 1, 3-19 (2007)), the contents of which are incorporated in entirety herein by reference.

Next, at step 415, based on the requestor ID and time stamp information in the information about print tasks, each of the historical print task equivalence classes is mapped into a user sequence representing the corresponding print flow of the historical print task equivalence class.

Specifically, at this step, for each of the historical print task equivalence classes, by using the requestor ID information in the information about the historical print tasks in the historical print task equivalence class in the information about print tasks, each of the historical print tasks is associated with a corresponding user. Then, in the time stamp order of the historical print tasks in the historical print task equivalence class, the users of the various historical print tasks are associated together to form a user sequence. Thus, since the user sequence is formed by associating the users of the historical print tasks in the historical print task equivalence class together in the time stamp order of the historical print tasks, it can represent the print flow of the historical print tasks. Thus, in this way, each of the historical print task equivalence classes can be mapped into a user sequence capable of representing the corresponding print flow of the historical print task equivalence class.

Next, at step 420, based on organizational structure information, user sequences each spanning a plurality of organizational units are identified from the user sequences each representing a print flow, and respectively considered as an informal workflow.

Specifically, at this step, first, based on the organizational structure information obtained, for example, from the records of the human resource management department of the enterprise, users in each of the user sequences are associated with respective organizational units they belong to; further, user sequences each spanning a plurality of organizational units are identified and respectively considered as an informal workflow.

Further, the same or similar documents in the document equivalence classes corresponding to the identified user sequences each spanning a plurality of organizational units are considered as that participating in informal workflows.

In addition, in an embodiment, at this step, first, the most commonly occurring user sequences are found from the obtained plurality of user sequences each representing a print flow, and then user sequences each spanning a plurality of organizational units are identified from the most commonly occurring user sequences and respectively considered as an informal workflow.

In addition, in other embodiments, after obtaining a plurality of user sequences each representing a print flow and before identifying informal workflows, the plurality of user sequences may be condensed. For example, for a user sequence, a plurality of instances of a same organizational unit therein which have appeared in other user sequences are removed.

The above is a detailed description of the method for analyzing usage of printers to identify informal workflows of the present embodiment. In this embodiment, by mining historical usage data of the printers and mapping it as user sequences each representing a corresponding print flow, informal workflows each spanning a plurality of organizational units which have printed same or similar documents can be identified.

Next, as another specific example, a method for analyzing usage of printers to optimize print policies according to the process of FIG. 1 will be described.

Figure 5:
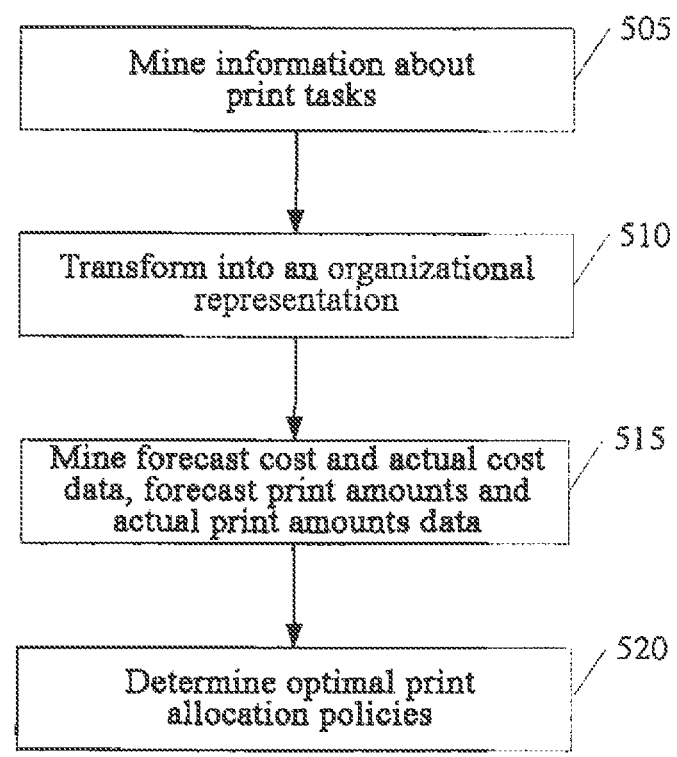
FIG. 5 is a flowchart of a process of analyzing usage of printer to optimize print policies according to an embodiment of the present invention.

FIG. 5 is a flowchart of a method for analyzing usage of printers to optimize print policies according to an embodiment of the present invention. As shown in FIG. 5, first, at step 505, from one or more printers, information about a plurality of print tasks performed by the printers is mined. The information about print tasks mined from the printers may contain, for example, for each of the print tasks, at least such information as requestor ID as well as request size, time stamp and document attributes used for subsequent analysis of policies.

Next, at step 510, based on the above mined information about print tasks, each of the historical print tasks is associated to a corresponding organizational unit so as to transform the information about print tasks into an organizational representation. Specifically, at this step, by using the requestor IDs in the information about print tasks, each of the historical print tasks is associated with a corresponding user. Then, based on the organizational structure information containing the users, which can be obtained, for example, from the records of the human resource management department of the enterprise, each of the users performing the historical print tasks is further associated with the organizational unit he/she belongs to. In this embodiment, the obtained organizational structure may be represented, for example, as a tree structure, and further each of the users performing the historical print tasks is associated with his/her corresponding organizational unit node in the tree structure, thus forming an organizational representation.

Next, at step 515, for each of the organizational units in the organizational representation, the forecast cost and actual cost data, forecast print amounts and actual print amounts data are mined. The forecast cost and actual cost data can be obtained, for example, from financial reporting records on forecast and actual cost of the financial department of the enterprise.

At step 520, based, for example, on the forecast cost and actual cost data, the forecast print amounts and actual print amounts data and the information about print tasks, optimal print allocation policies are determined for each of the organizational units in the organizational representation.

The above is a detailed description of the method for analyzing usage of printers to optimize print policies. In the present embodiment, by mining historical usage data of the printers, print policy optimization can be performed on each of the organizational units associated with the printers based on the mined historical usage data, thus reducing unnecessary paper consumption.

Under the same inventive concept, the present invention provides an apparatus for analyzing usage of printers, which will be described below in conjunction with the drawings.

Figure 6:
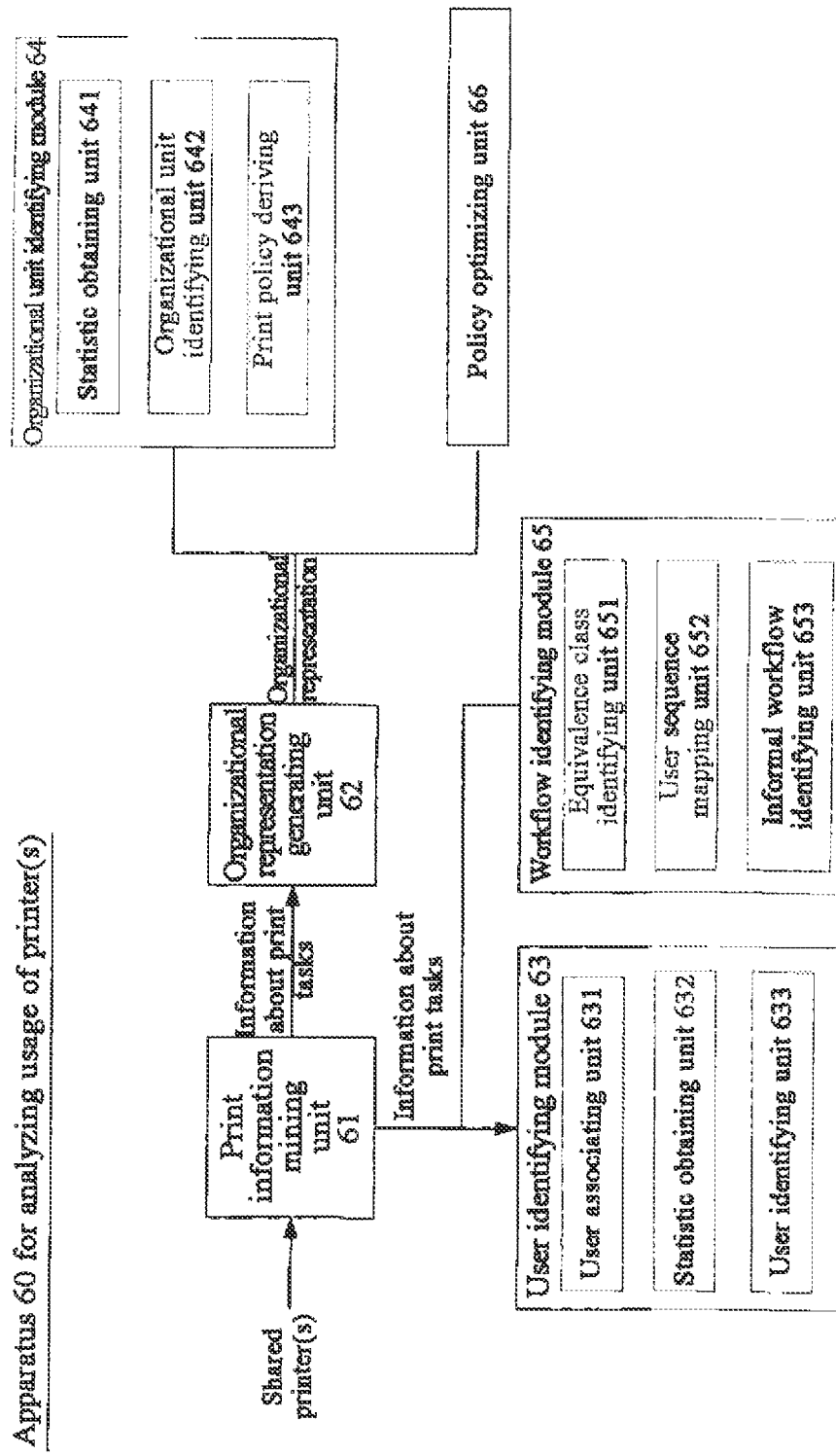
FIG. 6 is a block diagram of an apparatus for analyzing usage of printers according to an embodiment of the present invention.

FIG. 6 is a block diagram of an apparatus for analyzing usage of printers according to an embodiment of the present invention. As shown in FIG. 6, an apparatus 60 for analyzing usage of printers of the present embodiment comprises print information mining unit 61, organizational representation generating unit 62, user identifying module 63, organizational unit identifying module 64, workflow identifying module 65 and policy optimizing unit 66.

Therein, the print information mining unit 61 is configured to mine, from one or more printers, information about a plurality of print tasks performed by the printers. The information about print tasks may contain, for example, for each of the print tasks, at least such information as print requestor, print document attributes and print time.

The organizational representation generating unit 62 is configured to associate each of the print tasks to the organizational unit to which the user performing the print task belongs based on the print requestor information in the information about print tasks and the organizational structure information obtained, for example, from the human resource management department, thus transforming the information about print tasks into an organizational representation.

The user identifying module 63 is configured to identify users having a costly pattern based on the information about print tasks. As shown in FIG. 6, the user identifying module 63 may further comprise user associating unit 631 for associating each of the historical print tasks to a corresponding user performing the print task based on the requestor information in the information about print tasks, statistic obtaining unit 632 for obtaining statistics of print amounts over a specified time period for each of the users based on such information as print time and document attributes in the information about print tasks, and user identifying unit 633 for identifying users whose print amounts over the specified time period exceed predefined print amounts.

The organizational unit identifying module 64 is configured to identify organizational units having a costly pattern from the organizational representation based on the information about print tasks. As shown in FIG. 6, the organizational unit identifying module 64 may further comprises statistic obtaining unit 641 for obtaining statistics of print amounts over a specified time period for each of the organizational units in the organizational representation based on such information as print time and document attributes in the information about print tasks, organizational unit identifying unit 642 for identifying organizational units of which print amounts over the specified time period depart from print policies from the organizational representation, and print policy deriving unit 643 for deriving print policies for one or more organizational units in the organizational representation based on the distribution of historical print frequencies and/or print request sizes of the organizational unit(s).

The print amounts over the specified time period may comprise, for example, one or more of the group consisting of: the number of documents printed over the specified time period, the total size of the documents printed over the specified time period, and the number of times a same document is printed over the specified time period.

The workflow identifying module 65 is configured to identify informal workflows having a costly pattern based on the information about print tasks. As shown in FIG. 6, the workflow identifying module 65 may further comprise an equivalence class identifying unit 651 for identifying a plurality of historical print task equivalence classes corresponding to the information about print tasks by looking for all equivalence classes of same or similar documents through performing cluster analysis using a fuzzy name matching algorithm based on the document attributes in the information about print tasks, where each of the historical print task equivalence class comprises a plurality of historical print tasks involving same or similar documents.

The workflow identifying module 65 may further comprise a user sequence mapping unit 652 for, with respect to each of the historical print task equivalence classes, associating each of the historical print tasks therein with a user, and further associating these users together in the time stamp order of the historical print tasks to form a user sequence capable of representing the print flow of the historical print task equivalence class based on the print requestor information in the information about print tasks, thereby mapping the historical print task equivalence class into the user sequence representing its print flow, and an informal workflow identifying unit 653 for, based on the organizational structure information obtained, for example, from a human resource management department, identifying user sequences each spanning a plurality of organizational units from the plurality of user sequences each representing a print flow obtained by the user sequence mapping unit 652, the user sequences each spanning a plurality of organizational units being respectively considered as an informal workflow.

The informal workflow identifying unit 653 may identify user sequences each spanning a plurality of organizational units from a plurality of the most commonly occurring user sequences each representing a print flow, and takes them respectively as an informal workflow.

The policy optimizing unit 66 is configured to mine, for example, the forecast cost and actual cost data, and forecast print amounts and actual print amounts data for each of the organizational units in the organizational representation, and based on the forecast cost and actual cost data, the forecast print amounts and actual print amounts data and the information about print tasks, perform print policy optimization on each of the organizational units.

The above is a detailed description of the apparatus for analyzing usage of printers of the embodiment. The apparatus 60 for analyzing usage of printers of the embodiment and its components can be implemented with specifically designed circuits or chips or be implemented by a computer (processor) executing corresponding programs.

In addition, in an embodiment, the apparatus 60 for analyzing usage of printers may only comprise the print information mining unit 61, the organizational representation generating unit 62, the organizational unit identifying module 64 and the policy optimizing unit 66.

In another embodiment, the apparatus 60 for analyzing usage of printers may only comprise the print information mining unit 61 and the workflow identifying module 65.

While the method and apparatus for analyzing usage of printers of the present invention have been described in detail with some exemplary embodiments, these embodiments are not exhaustive, and those skilled in the art may make various variations and modifications within the spirit and scope of the present invention. Therefore, the present invention is not limited to these embodiments; rather, the scope of the present invention is solely defined by the appended claims.

The invention claimed is:

1. A method for analyzing usage of printers, comprising:
    obtaining from at least one printer, information about a plurality of print tasks performed by each printer, wherein the information about print tasks at least contains information of print requesters, print document attributes, and print time of each of the print tasks, the information of each print requestor including a requestor identifier (ID) of the print requestor;
    transforming the information about print tasks into an organizational representation, wherein the transforming includes associating the information about print tasks with information of an organizational structure containing the print requesters, wherein the information of the organizational structure comprises a tree structure including a plurality of nodes, wherein each node of the tree structure represents an organizational unit in the organizational structure;
    wherein the transforming further includes:
        associating each print requestor with at least one of the organizational unit nodes in the organizational structure using the requestor ID of the print requestor; and
        obtaining and consolidating the information about print tasks for the print requesters associated with each of the organizational unit nodes in the organizational structure to generate the organizational representation;
    comparing the consolidated information of each organizational unit with at least one predefined metric; and
    identifying, in response to the comparing, organizational units that exceed the at least one predefined metric.

2. The method for analyzing usage of printers according to claim 1, further comprising:
    identifying organizational units in which the print tasks depart from respective print policies from the organizational representation.

3. The method for analyzing usage of printers according to claim 2, wherein the step of identifying organizational units in which the print tasks depart from respective print policies from the organizational representation further comprises:
    based on the information of print time and print document attributes in the information about print tasks, obtaining, for each of the organizational units in the organizational representation, statistics of print amounts of its users over a specified time period; and
    identifying organizational units in which the print amounts over the specified time period depart from their respective print policies from the organizational representation.

4. The method for analyzing usage of printers according to claim 3, wherein the print amounts over the specified time period comprise at least one print amount selected from the group consisting of:
    a number of documents printed over the specified time period, a total size of documents printed over the specified time period, and a number of times a same document is printed over the specified time period.

5. The method for analyzing usage of printers according to claim 2, wherein the print policies are predefined, and contain at least one print policy selected from the group consisting of:
    allowing the organizational unit to print a predefined number of documents over the specified time period, allowing the organizational unit to print a predefined total size of documents over the specified time period, and allowing the organizational unit to print a same document for predefined times over the specified time period.

6. The method for analyzing usage of printers according to claim 2, further comprising, before the step of identifying organizational units in which the print tasks depart from respective print policies from the organizational representation, the step of:
    for one or more organizational units in the organizational representation, based on at least one of a distribution of historical print frequencies and print requests sizes of the organizational unit, deriving print policies therefor.

7. The method for analyzing usage of printers according to claim 1, further comprising:

based on the information about print tasks, optimizing the print policies for each of the organizational units in the organizational representation.

8. The method for analyzing usage of printers according to claim 7, wherein the step of optimizing the print policies for each of the organizational units in the organizational representation further comprises:

mining forecast print amount data and actual print amounts data for each of the organizational units in the organizational representation; and determining optimal print allocation policies for each of the organizational units based on the information about print tasks and the forecast print amounts and actual print amounts data thereof.

9. The method for analyzing usage of printers according to claim 1, wherein the information about print tasks further comprises:

at least one of a printer ID and print characteristics.

10. The method for analyzing usage of printers according to claim 1, wherein the document attributes comprise:

at least one of file type, document name, document size, and business process watermark.

* * * * *